United States Patent [19]

Tsuchiya et al.

[11] Patent Number: 5,105,776
[45] Date of Patent: Apr. 21, 1992

[54] APPARATUS FOR REDUCING ENGINE IDLING VIBRATION

[75] Inventors: Yoshinobu Tsuchiya, Fujisawa; Ken Kurabayashi, Chigasaki, both of Japan

[73] Assignee: Isuzu Motors Limited, Tokyo, Japan

[21] Appl. No.: 610,581

[22] Filed: Nov. 8, 1990

[30] Foreign Application Priority Data

Nov. 9, 1989 [JP] Japan .................. 1-291724

[51] Int. Cl.⁵ .............................................. F02B 75/06
[52] U.S. Cl. ........................................ 123/192.1; 123/2
[58] Field of Search .......... 123/1 R, 2, 192 R, 179 A, 123/179 B, 179 M

[56] References Cited

FOREIGN PATENT DOCUMENTS

| | | |
|---|---|---|
| 0354790 | 8/1989 | European Pat. Off. . |
| 1438977 | 11/1968 | Fed. Rep. of Germany . |
| 58-185940 | 10/1983 | Japan . |
| 61-149539 | 7/1986 | Japan . |
| 2213292 | 8/1989 | United Kingdom . |

Primary Examiner—Noah P. Kamen
Attorney, Agent, or Firm—Staas & Halsey

[57] ABSTRACT

The electric energy generated by an electric generator driven by an engine on a motor vehicle is stored in a large-capacity capacitor when the rotational speed of the engine increases while the engine is idling, thereby imposing a load on the engine. At this time, the increase in the rotational speed of the engine is suppressed. The electric energy stored in the capacitor is supplied to a battery on the motor vehicle, charging the battery.

3 Claims, 2 Drawing Sheets

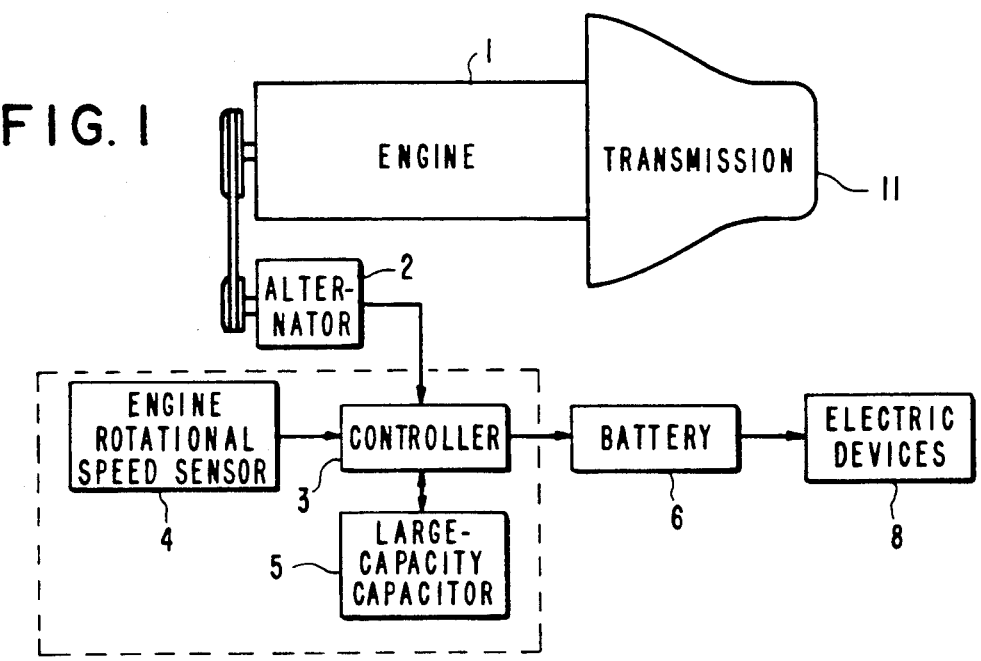
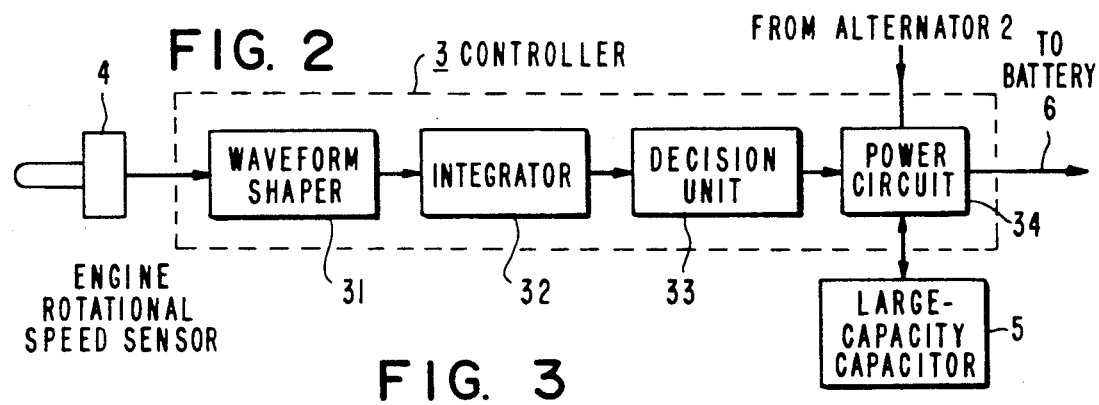
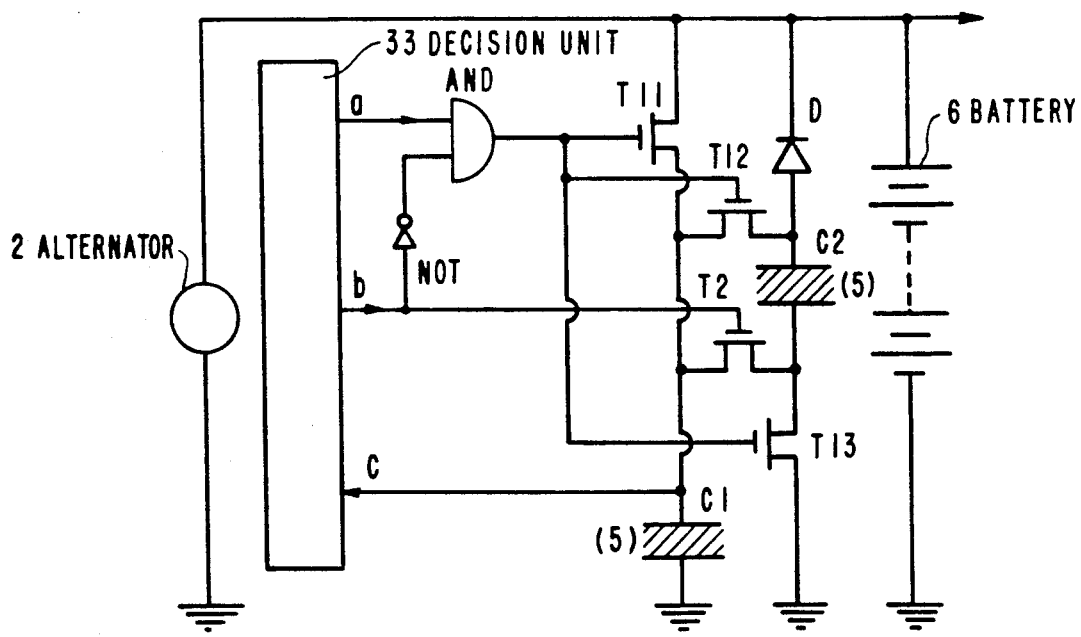

APPARATUS FOR REDUCING ENGINE IDLING VIBRATION

BACKGROUND OF THE INVENTION

The present invention relates to an apparatus for reducing the vibrations of an engine, which are produced while the engine is idling.

Internal combustion engines produce torque variations or fluctuations by the combustion strokes of respective engine cylinders during operation, and such torque variations or fluctuations result in engine vibrations. The vibrations of the engine are transmitted to the vehicle body of a motor vehicle on which the engine is mounted, generating noises that make the driver and passengers in the passenger compartment uncomfortable.

One practical solution has been to employ a balance shaft parallel to the crankshaft of the engine. The balance shaft is rotated about its own axis in ganged relation to the crankshaft for canceling out variations of the engine torque. While the balance shaft is effective in reducing the engine vibration, a complex mechanism is necessary to rotate the balance shaft in synchronism with the crankshaft, and the balance shaft and such a mechanism make the engine heavy.

Another proposal is a vehicle generator control apparatus disclosed in Japanese Laid-Open Patent Publication No. 63(1988)-167640. The disclosed vehicle generator control apparatus controls the consumption of electric energy generated by a generator which is driven by an engine, based on the rotational speed of the engine. Variations or fluctuations in the rotational speed of the engine while it is idling are suppressed by placing the engine under a load depending on the rotational speed of the engine. In order to prevent the rotational speed of the engine from increasing, the electric current from the generator is supplied to a resistor, which consumes the electric current as heat. Therefore, the generated electric energy is wasted.

SUMMARY OF THE INVENTION

It is an object of the present invention to provide an apparatus for reducing variations or fluctuations in the rotational speed of an engine while the engine is idling, by producing electric energy thereby. The apparatus storing the electric energy which has been generated.

According to the present invention, there is provided an apparatus for reducing the vibration of an engine mounted on a motor vehicle while the engine is idling comprising an electric generator drivable by the engine, capacitor means adapted to be mounted on the motor vehicle for storing electric energy, a battery adapted to be mounted on the motor vehicle, detecting means for detecting a variation in the rotational speed of the engine, capacitor charging control means for charging the capacitor means with electric energy generated by the electric generator when the rotational speed of the engine varies as detected by the detecting means, and battery charging control means for charging the battery with the electric energy stored in the capacitor means.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a block diagram of an apparatus for reducing the vibration of an engine, which is produced while the engine is idling, according to an embodiment of the present invention;

FIG. 2 is a block diagram of a controller in the apparatus shown in FIG. 1;

FIG. 3 is a circuit diagram of the controller shown in FIG. 2; and

DETAILED DESCRIPTION OF THE PREFERRED EMBODIMENT

Figure 4:
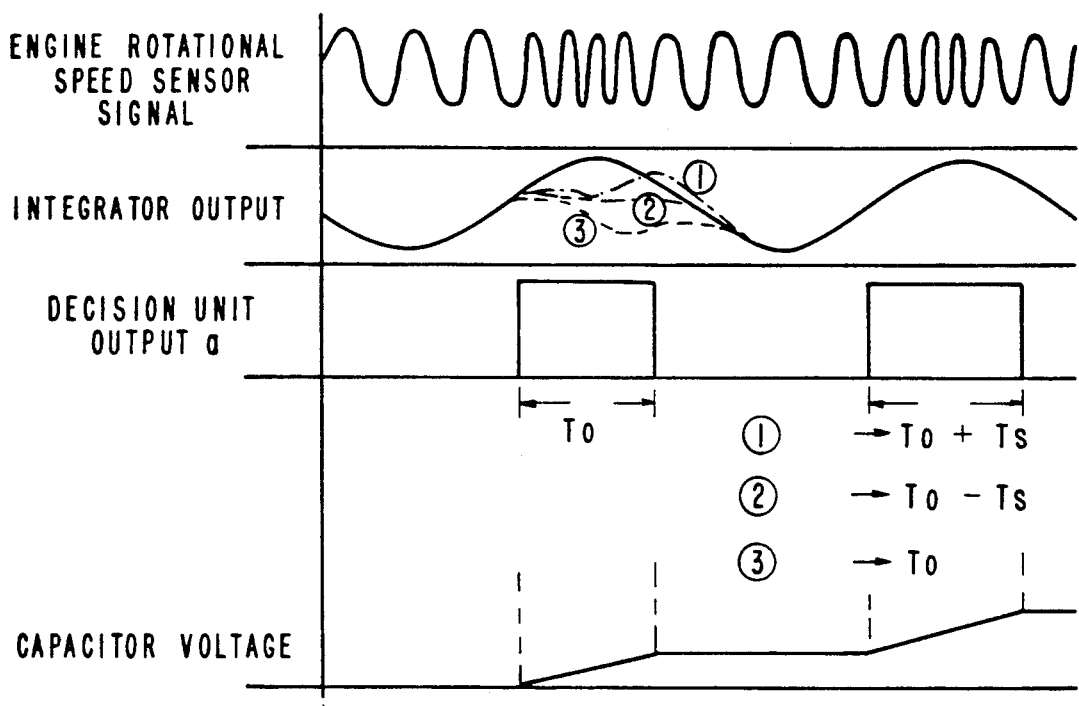
FIGS. 4 and 5 are diagrams of signal waveforms produced in the controller, the diagrams being illustrative of operation of the apparatus.

FIGS. 1 and 2 show an apparatus for reducing the vibration of an engine, which is produced while the engine is idling.

As shown in FIGS. 1 and 2, an engine 1 is mounted on a motor vehicle (not shown) and produces output power which is transmitted through a transmission 11 to drive road wheels (not shown).

An alternator 2 is driven by the torque of the engine 1 through a transmission belt. The alternator 2 generates AC electric energy, but supplies DC electric energy through a built-in rectifier.

A controller 3 is responsive to a signal from an engine rotational speed sensor 4 for storing the electric energy from the alternator 2 into a large-capacity capacitor 5, controlling the electric energy from the alternator 2 as a load on the engine 1 thereby to control the output power of the engine 1, and supplying electric charges stored in the large-capacity capacitor 5 to a battery 6 to charge the battery 6. The motor vehicle has electric devices 7 which are powered by the battery 6.

As shown in FIG. 2 in greater detail, the controller 3 comprises a waveform shaper 31, an integrator 32, a decision unit 33, and a power circuit 34. The waveform shaper 31 removes noise components from the signal from the engine rotational speed sensor 4, thereby producing a signal waveform which can easily be integrated. The signal from the waveform shaper 31 is applied to the integrator 32, which integrates the applied signal and applies the integrated signal as a signal based on the rotational speed of the engine to the decision unit 33. The decision unit 33 is in the form of a microcomputer and determines a tendency for the signal from the integrator 32 to increase in level. The decision unit 33 also controls the power circuit 34 to transmit the electric energy from the alternator 2 and store the same in the large-capacity capacitor 5, monitors the voltage across the large-capacity capacitor 5, and controls the power circuit 34 to transmit the electric energy from the capacitor 5 to the battery 6 to charge the latter. The decision unit 33 also has a memory.

Figure 5:
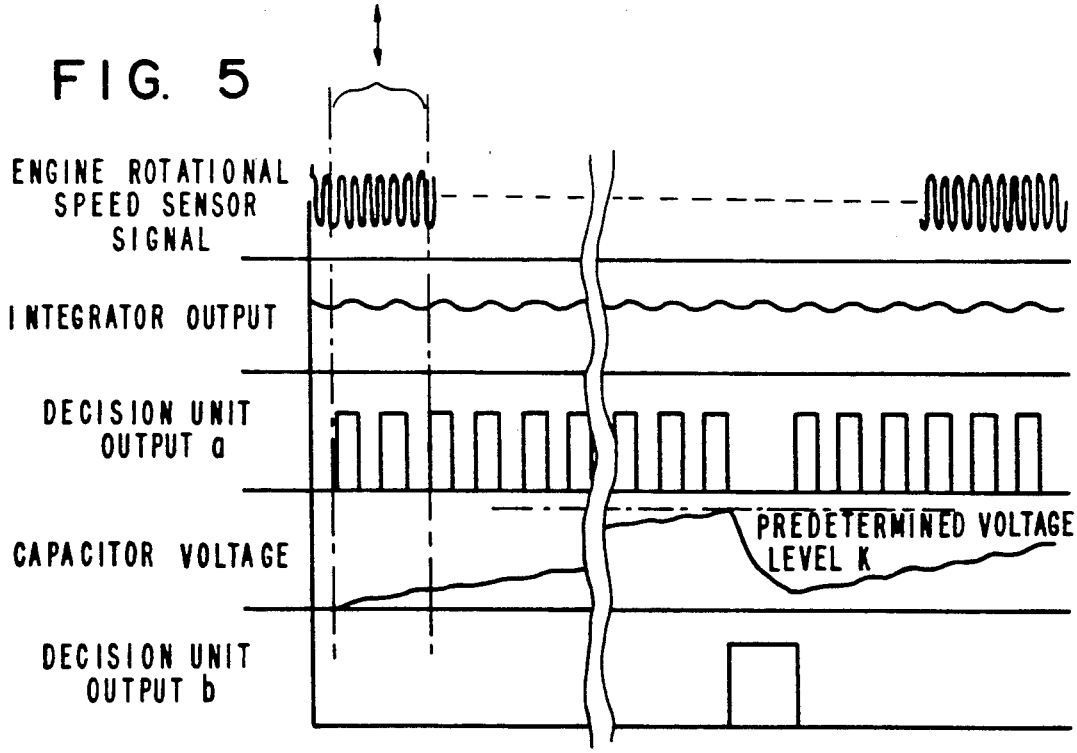

FIG. 3 shows a circuit arrangement of the controller 3, including the power circuit 34, the alternator 2, the large-capacity capacitor 5 that is composed of capacitors C1, C2, and the battery 6. FIGS. 4 and 5 show signal waveforms in the circuit arrangement shown in FIG. 3, FIG. 5 being illustrative of the manner in which the large-capacity capacitor 5 is discharged.

Operation of the apparatus according to the present invention will be described below. As shown in FIG. 4, the signal from the engine rotational speed sensor 4 is converted into a voltage signal (integrator output) proportional to the rotational speed of the engine by the waveform shaper 31 and the integrator 32. When the rotational speed has a tendency to increase, the decision unit 33 produces a signal over a predetermined time To at an output terminal a. When the signal is produced from the output terminal a of the decision unit 33, FETs T11, T12, T13 are turned on through an AND gate, allowing the electric energy from the alternator 2 to be transmitted through the FET T11 to the capacitor C1 to charge the capacitor C1, and also allowing the electric energy from the alternator 2 to be transmitted through the FETs T12, T13 to the capacitor C2 to charge the capacitor C2. The charging current supplied to the capacitors C1, C2 places an increased load on the alternator 2 and hence on the engine 1, with the result that the increase in the rotational speed of the engine 1 is suppressed.

Each of the capacitors C1, C2 (which make up the large-capacity capacitor 5) is in the form of an electric double-layer capacitor having a large electrostatic capacitance and a lower internal resistance, and should have such characteristics as to be capable of instantaneously storing the electric energy from the alternator 2 efficiently.

The decision unit 33 continuously monitors the signal from the integrator 32, and determines a pulse duration for the output signal of the decision unit 33 in a next cycle based on a change in the signal from the integrator 32 after the decision unit 33 produces the signal at the output terminal a during the time To. The time To, which may be To +Ts, To−Ts, or simply To depending upon the signal from the integrator 32, is stored in the memory of the decision unit 3.

As described above, while the rotational speed of the engine 1 is increasing, the capacitors C1, C2 are charged. As these capacitors C1, C2 are continuously charged, the charged electric energy reaches a level corresponding to their electrostatic capacitance beyond which they cannot be charged anymore. When the voltage across the capacitor C1, which is being monitored by the decision unit 3 through an input terminal c thereof, reaches a predetermined voltage level K, the decision unit 33 produces a signal from an output terminal b thereof. The signal from the output terminal b is applied to turn off the AND gate, de-energizing the FETs T11, T12, T13, and also applied to energize an FET T2. The capacitors C1, C2 are now connected in series with each other by the FET T2, whereupon the voltages across the capacitors C1, C2 are added and applied through a diode D to the battery 6, thereby charging the battery 6. The diode D also serves to prevent electric currents from the alternator 2 and the battery 6 from flowing back to the capacitor C2.

As described above, in order to suppress variations or fluctuations in the rotational speed of the engine, which are responsible for the vibration of the engine while the engine is idling, the decision unit detects a tendency for the rotational speed of the engine to increase based on a signal from the engine rotational speed sensor, and controls the power circuit to store the electric energy from the alternator in the large-capacity capacitor. Therefore, the load on the engine is increased to reduce the increase in the rotational speed of the engine, so that the variations or fluctuations in the rotational speed of the engine can be reduced.

Furthermore, the electric energy stored in the large-capacity capacitor is supplied to the battery to charge the battery. Since the electric energy stored in the large-capacity capacitor is used as a power supply for electric devices on the motor vehicle, the apparatus of the present invention is an energy saver. The electric energy stored in the large-capacity capacity may be directly supplied to an engine starter to get the engine started, the battery on the motor vehicle may be reduced in capacity and size.

Inasmuch as the apparatus according to the present invention makes a balance shaft unnecessary in the engine, the engine is rendered less complex, heavy, and expensive.

Although a certain preferred embodiment has been shown and described, it should be understood that many changes and modifications ma be made therein without departing from the scope of the appended claims.

What is claimed is:

1. An apparatus for reducing the vibration of an engine mounted on a motor vehicle while the engine is idling, comprising:
   an electric generator drivable by the engine;
   capacitor means adapted to be mounted on the motor vehicle, for storing electric energy;
   a battery adapted to be mounted on the motor vehicle;
   detecting means for detecting a variation in the rotational speed of the engine;
   capacitor charging control means for charging said capacitor means with electric energy generated by said electric generator when the rotational speed of the engine varies as detected by said detecting means; and
   battery charging control means for charging said battery with the electric energy stored in said capacitor means.

2. An apparatus according to claim 1, wherein said capacitor means comprises a plurality of capacitors, said capacitor charging control means comprising means for charging said capacitors which are connected parallel to each other, said battery charging control means comprising means for charging said battery with the electric energy stored in said capacitors which are connected in series with each other.

3. An apparatus according to claim 1, wherein said battery charging control means comprises means for monitoring a voltage across said capacitor means, and means for charging said battery with the electric energy stored in said capacitor means when the monitored voltage across said capacitor means reaches a predetermined voltage level.

* * * * *

UNITED STATES PATENT AND TRADEMARK OFFICE
CERTIFICATE OF CORRECTION

PATENT NO. : 5,105,776
DATED : April 21, 1992
INVENTOR(S) : Yoshinobu Tsuchiya et al.

It is certified that error appears in the above-identified patent and that said Letters Patent is hereby corrected as shown below:

Col. 4, line 22, change "ma" to --may--.

Signed and Sealed this

Twenty-second Day of February, 1994

Attest:

BRUCE LEHMAN

Attesting Officer

Commissioner of Patents and Trademarks